US006196943B1

(12) United States Patent
Chen

(10) Patent No.: US 6,196,943 B1
(45) Date of Patent: Mar. 6, 2001

(54) ELECTRIC TOOL KNOB CONTROL APPARATUS

(75) Inventor: Ting-Kuang Chen, Keelung (TW)

(73) Assignee: Trinity Metallize Co., Ltd. (TW)

( * ) Notice: Subject to any disclaimer, the term of this patent is extended or adjusted under 35 U.S.C. 154(b) by 0 days.

(21) Appl. No.: 09/417,224

(22) Filed: Oct. 13, 1999

(51) Int. Cl.$^7$ .................... F16H 3/74
(52) U.S. Cl. .................... 475/254; 475/257
(58) Field of Search .................... 475/254, 257, 475/263, 264

(56) References Cited

U.S. PATENT DOCUMENTS

| | | | | |
|---|---|---|---|---|
| 4,861,201 | | 8/1989 | Cuileron . | |
| 4,892,013 | * | 1/1990 | Satoh | 74/785 |
| 4,898,249 | * | 2/1990 | Ohmori | 173/12 |
| 5,277,527 | | 1/1994 | Yokota et al. . | |
| 5,437,524 | | 8/1995 | Huang . | |
| 5,711,739 | * | 1/1998 | Hashimoto et al. | 475/254 |

FOREIGN PATENT DOCUMENTS

| | | | |
|---|---|---|---|
| 3-815883 | * | 5/1988 | (DE) . |
| 7-293583 | * | 4/1994 | (JP) . |
| 8-124460 | * | 10/1994 | (JP) . |

* cited by examiner

*Primary Examiner*—Charles A Marmor
*Assistant Examiner*—Tisha D. Waddell
(74) *Attorney, Agent, or Firm*—Bacon & Thomas, PLLC

(57) ABSTRACT

Electric tool knob control apparatus comprises a compressing spring and a cam controller, which are set consequently on the sleeve of drive shaft base. Compressing spring is set between cam controller and base. On the sleeve, an external gearwheel is installed. Cam controller includes a spur cam-disk and a passive cam-disk. On spur cam-disk and passive cam-disk, a cam-disk flange and a cam-disk recess are circularly arranged and oppositely set up; therefore, cam-disk flange and cam-disk recess may engage to each other. On spur cam-disk, a plurality of planet gearwheel is set pivotally. By covering the outside of cam controller and sleeve with a knob with inward gear set inside diameter, planet gear wheel may engage with inward gear and external gear wheel in the same time. Also, passive cam-disk, which engages with knob, may rotate with knob and move in axial direction of knob. Passive cam-disk and spur cam-disk may be driven to rotate while knob is moved to rotate. Therefore, passive cam-disk moves along axial direction to relax and compress the compressing spring for regulating drive shaft torque. By the rotational speed difference, knob may regulate torque and be homed in 360°.

3 Claims, 4 Drawing Sheets

ELECTRIC TOOL KNOB CONTROL APPARATUS

FIELD OF THE INVENTION

The present invention relates to electric tool knob control apparatus, and more specifically to a knob which may rotate forward or backward to regulate drive shaft torque of electric tool; also, torque can be homed to initial status by rotating knob around 360° in same direction.

BACKGROUND OF THE INVENTION

It's well known that in regulable drive shaft torque electric tool a knob is set on the outside of drive shaft. By engaging with the machine components inside the tool, knob may regulate drive shaft torque. Moreover, a torque scale is set on electric tool to regulate the need output torque with knob in which a pointer is installed. The pointer and the torque scale may read out drive shaft torque.

In early time, electric tool knob cannot rotate around 360° in same direction. The rotating is along low torque level to high torque level. When knob is in the highest torque level, knob should be rotated in opposite direction for going to low torque level. Therefore, it's need to move along a long distance and inconvenient for use. The present invention is to provide a switch device for solving the said drawback.

SUMMARY OF THE INVENTION

The primary object of the present invention is to provide an electric tool knob control apparatus, which may regulate the output torque of drive shaft and home to initial status either forward or backward direction around 360°. To switch between high torque and low torque is faster than before.

Therefore, the present invention is to provide an electric tool knob control apparatus in which a compressing spring and a cam controller are set consequently on the sleeve of drive shaft base. Compressing spring locates between cam controller and base. On sleeve, an external gear wheel is set. Cam controller includes a spur cam-disk and a passive cam-disk. On spur cam-disk and passive cam-disk, cam-disk flange and cam-disk recess are circular arranged and relatively set; therefore, cam-disk flange and cam-disk recess may engage to each other. On spur cam-disk, a plurality of planet gearwheel is set pivotally. By covering the outside of cam controller and sleeve with a knob with inward gear set inside diameter, planet gear wheel may engage with inward gear and external gear wheel in the same time. Also, passive cam-disk, which engages with knob, may rotate with knob and move in axial direction of knob. Passive cam-disk and spur cam-disk may be driven to rotate while knob is moved to rotate. Therefore, passive cam-disk moves along axial direction to relax and compress the compressing spring for regulating drive shaft torque. By the rotational speed difference, knob may regulate torque and be homed in 360°.

Other objects, advantages, and novel features of the invention will become more apparent from the following detailed description when taken in conjunction with the accompanying drawings.

DESCRIPTION OF THE PREFERRED EMBODIMENTS

Figure 1:
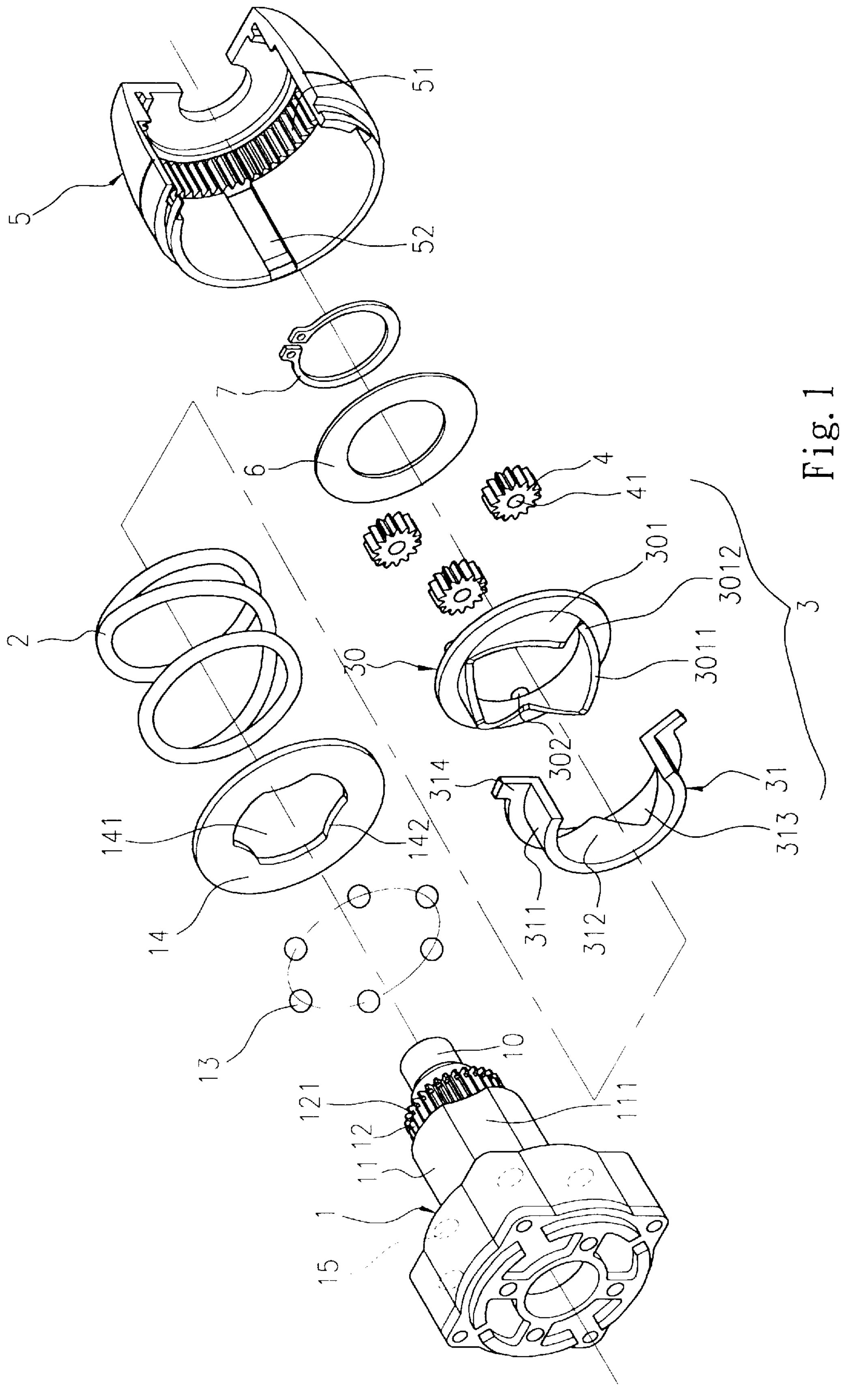
FIG. 1 shows the exploded view of the present invention
Figure 2:
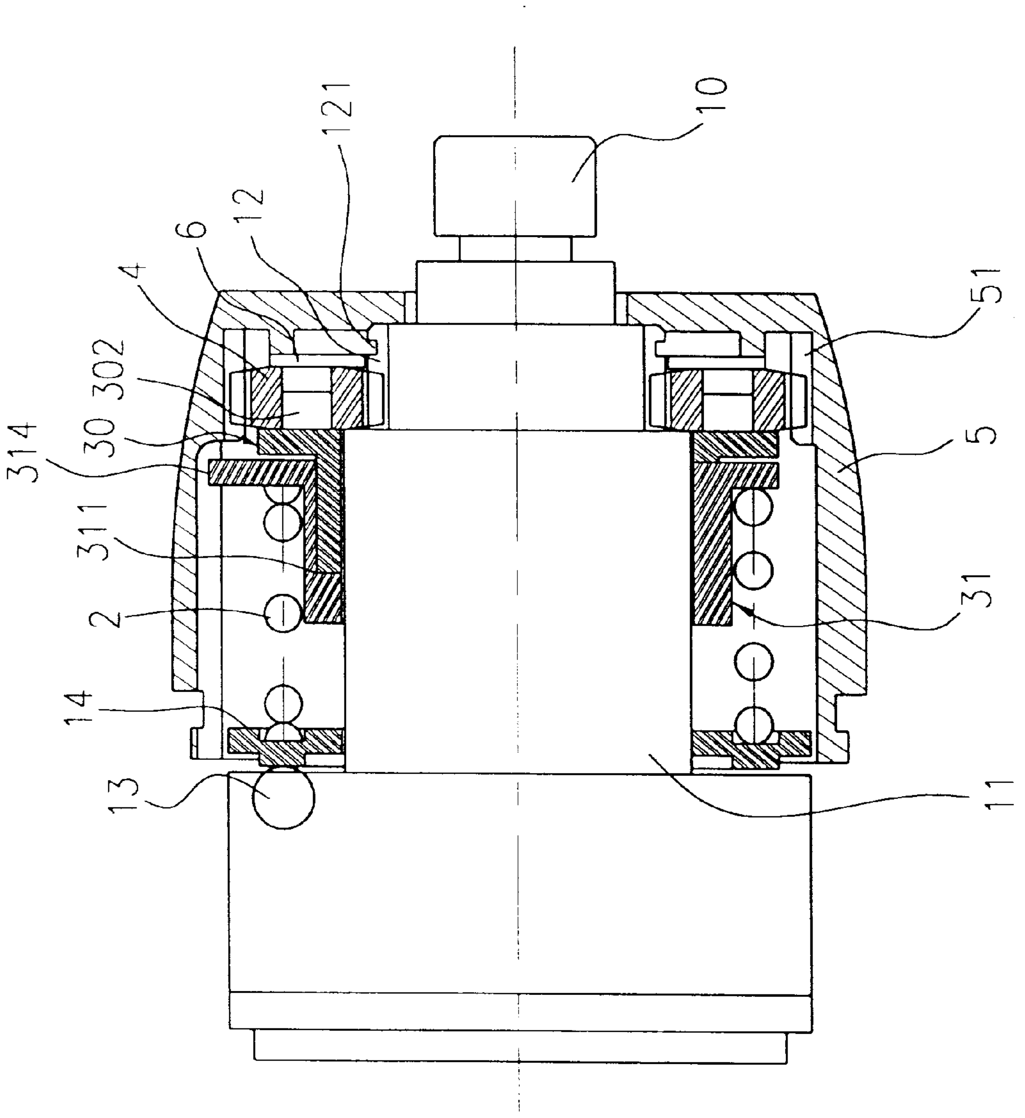
FIG. 2 is the cross-sectional view of the present invention without driving passive cam-disk by spur cam-disk.

Referring to FIG. 1 and FIG. 2 is the electric tool knob control apparatus provided by the present invention. The electric tool knob control apparatus comprises a base 1, a plurality of ball 13, a pressure plate 14, a compressing spring 2, a cam controller 3, a plurality of planet gear wheel 4, a spacer 6, and a knob 5. A sleeve 11 is fitted on base 1. Inside diameter of sleeve 11, a drive shaft 10 is set to match up with a bearing; therefore, drive shaft 10 can rotate inside sleeve 11. In drive shaft 10, an external gear wheel 12 is installed in which a engage recess 121 is created near the end of external gear wheel. On the surface of sleeve 11, a plurality of rectangle concavity 111 is created and parallel with axial direction. The engagement between base 1 and power supply system drives drive shaft 10 to rotate. The power supply system is not the point; therefore, it doesn't need to describe specifically. On the plan surface of base 1, a plurality of hole 15 is created for installing and protruding a ball 13. To a core hole 41 of pressure plate 14, a plurality of flange 142 is set coordinately to concavity 111 on sleeve 11. The alignment between core hole 141 and sleeve 11 lets sleeve 11 go through core hole 141. Therefore, pressure plate 14 can presses the said ball 13, and compressing spring 2 locates on the external diameter of sleeve 11 for pressing the pressure plate 14.

The said cam controller 3 includes a spur cam-disk 30 and passive cam-disk 31. On the edge of spur cam-disk 30, there is a cam-disk salient 301 installed. A plurality of circular arranged cam-disk flange 3011 with same angle is set on the fringe of cam-disk salient 301. Therefore, a cam-disk recess 3012 is coordinately formed to cam-disk flange 3011. In the embodiment of the present invention, cam-disk recess 3012 is formed in V shape with a radian and cam-disk flange is opposite V shape and coordinate to cam-disk recess 3012. On the other direction to cam-disk salient 301 of spur cam-disk 30, a plurality of cylinder 302 is set in axial direction. On the edge of passive cam-disk 30, there is a shield 311 installed. On the inside diameter of shield 311, there is a cam-disk recess 313 and a cam-disk flange 312 coordinately formed to the said cam-disk flange 3011 and the said cam-disk recess 3012. Therefore, cam controller 3 is formed by the completely engagement between cam-disk salient 301 of spur cam-disk 30 and the inside diameter of passive cam-disk 311 (as shown in FIG. 2). On passive cam-disk 31 a plurality of square salient 314 is set. After forming cam controller 3 with the combination of spur cam-disk 30 and passive cam-disk 31, base 1 is fixed to one end of passive cam-disk 31. Then, sleeve 11 goes through the inside diameter of passive cam-disk 31 and spur cam-disk 30. On the spur cam-disk 30 each cylinder 302 passes through core hole 41; therefore, planet gear wheel 4 may unrestrainedly rotate. Furthermore, circular spacer 6 covers planet gear wheel 4 and fastener 7 fastening on engage recess 121 of external gear wheel 12 to prevent the combination of spacer 6, planet gear wheel 4, cam-controller 3, pressure plate and ball departing from base 1.

Figure 4:
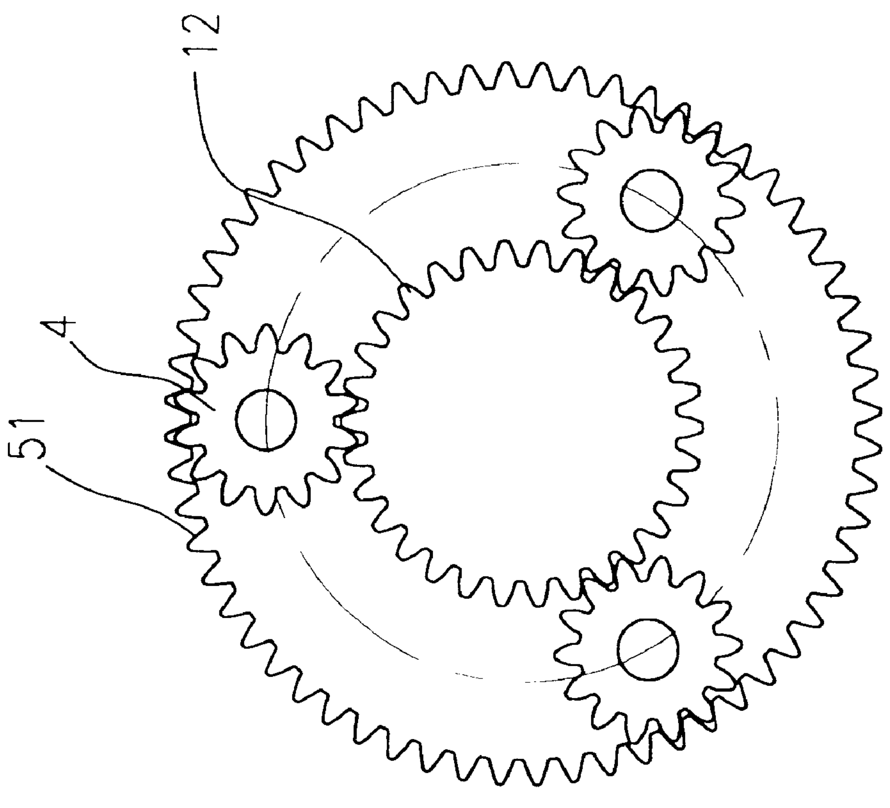
FIG. 4 is the top view of planet gear wheel engaging with external gear wheel and inward gear of knob in the present invention.

The said knob 5 holds cam controller 3, compressing spring 2 and sleeve 11 with an inside diameter. On the inside diameter of knob 5 inward gear 51 is set circularly, and in the axial direction of inside diameter, there is a plurality of sliding surface 52 set for holding said square salient 314. When knob 5 covering base 1, square salient 314 moves into along sliding surface 52. Therefore, each planet gear wheel may engage with inward gear 51 and the said external gear wheel (as shown in FIG. 4)

Figure 3:
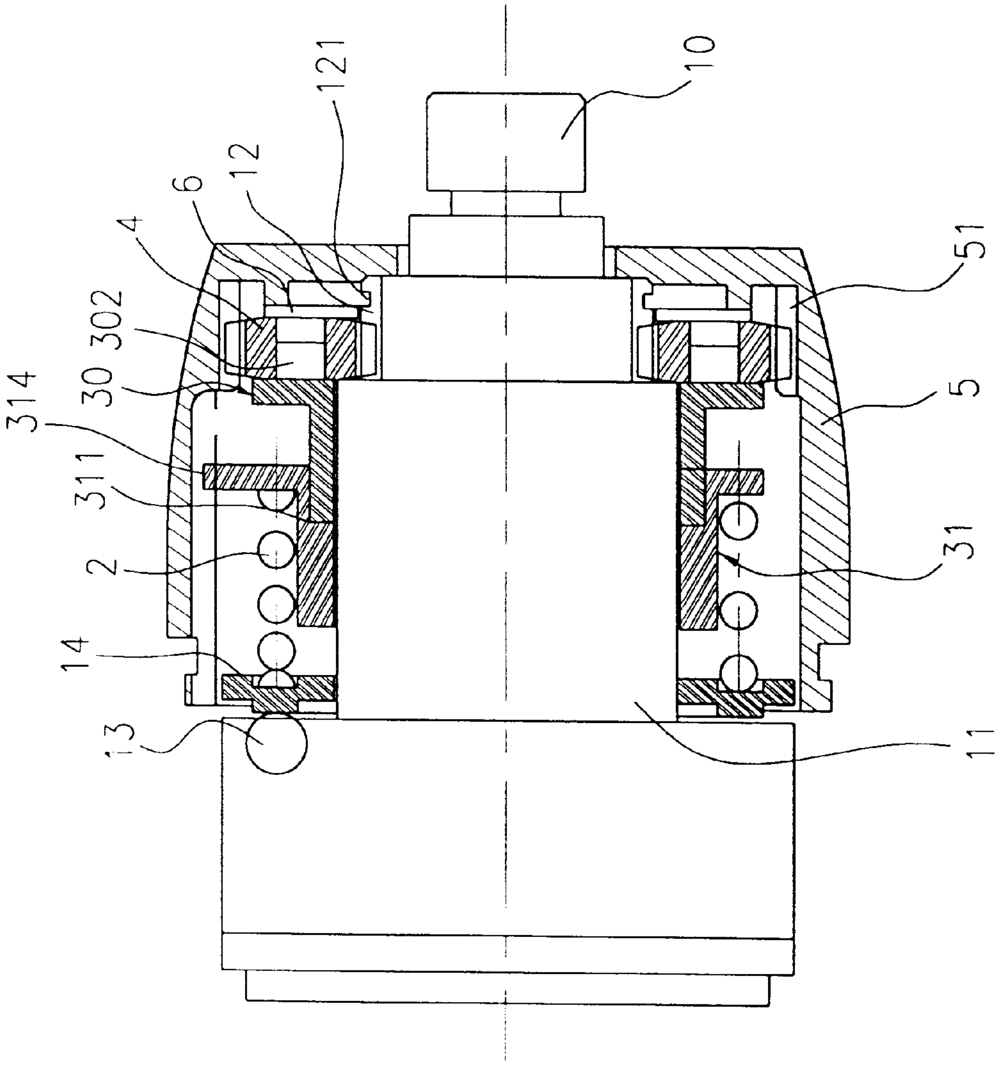
FIG. 3 is the cross-sectional view of the present invention with driving passive cam-disk by spur cam-disk.

As the mentioned combination, passive cam-disk 31 is driven to rotate by the rotating of knob 5, and inward gear 51 drives each planet gear wheel and spur cam-disk 30 rotate immediately. When spur cam-disk 30 rotating, cam-disk flange 3011 moves along cam-disk flange 312 or cam-disk recess 313. After cam-disk flanges 3011 and 312 engage each other (as shown in FIG. 3), passive cam-disk 31 is driven to move along the axial direction (square salient 314 moves along sliding surface 51 of knob 5); and passive cam-disk 31 presses compressing spring 2 to push pressure plate 14. Then, the press force on pressure plate 14 is transmitted to ball 1113. Also, compressing spring 2 may push passive cam-disk 31 moving to spur cam-disk 30 when cam-disk flanges 3011 and 312 engage with cam-disk recesses 313 and 3012. Because of the engagement between ball 13 and the turntable (not shown in drawing) of power system inside electric tool, the torque of drive shaft 10 may be regulated by changing the working force of ball 13 on the turntable. When working force is bigger, the resistance working on turntable is increasing and torque is increasing. Otherwise, the torque of drive shaft 10 is decreasing.

In addition, because inward gear is twice the diameter of external gear wheel 12, spur cam-disk 30 will turn two circles due to the engagement of planet gear wheel 4 and external gear wheel 12 when knob turns one circle. When passive cam-disk 31 turns one circle with knob 5, there is 120° angle between spur cam-disk 30 and passive cam-disk 31. When knob 5 and passive cam-disk 31 rotate 360° around, cam-disk flange 3011 of spur cam-disk 30 will engage cam-disk recess 313 of passive cam-disk 31 again and knob 5 may home again. Therefore, no matter what knob turns forward or backward, knob doesn't need to turns backward to regulate the torque of drive shaft 10.

Although this invention has been described with a certain degree of particularity, it is to be understood that the present disclosure has been made by way of example. Only and that numerous changes in the detailed construction and the combination and arrangement of parts may be restored to without departing from the spirit and scope of the invention as hereinafter claimed.

What is claimed is:

1. An electric tool knob apparatus, comprising;

a base on which a sleeve is installed and on the sleeve a drive shaft with an external gear wheel is set;

a compressing spring which covers on the external diameter of said sleeve with one of its ends;

a cam controller including a spur cam-disk and a passive cam-disk;

furthermore, on the spur cam-disk, installed a cam salient which has a plurality of circularly arranged cam-disk flange (3011) with same angle on the edge and between the cam-disk flange (3011) a cam-disk recess (3012) is formed corresponding to the cam-disk flange (3011), and a plurality of circularly arranged cylinder is installed on the spur cam-disk in the axial direction; the passive cam-disk has a shield in which a cam-disk recess 301 is created corresponding to the said cam-disk flange (3011) and a cam-disk flange 312 corresponding to the said cam-disk recess (3012) that make the said cam salient may be completely covered by the inside diameter of passive cam-disk; the passive cam-disk has a plurality of square salient installed on the flange and the said compressing spring covers the shield of passive cam-disk with the other end and makes shield pass through the inside diameter of spur cam-disk and passive cam-disk;

a plurality of planet gear wheel which is installed on the cylinder of the said spur cam-disk and may unrestrainedly rotate; and a knob which is installed on the said base and covers the said cam controller, the said compressing spring and the said shield; inside the knob, a circularly inward gear is installed for making the said planet gear engage with the inward gear and external gear wheel, and in the axial direction, a plurality of sliding surface is set corresponding to the square salient of passive cam-disk; therefore, the square salient may unrestrainedly move with the sliding surface.

2. The electric tool knob apparatus of claim 1, wherein the said sleeve is covered by a pressure plate, and between the pressure plate and the base, a plurality of ball is set to make the said compressing spring press the pressure plate with one end.

3. The electric tool knob apparatus of claim 1, wherein the said spur cam-disk and passive cam-disk has three cam-disk flanges (3011), (312) and three cam-disk recess (3012), (313) respectively, and the said inward gear is twice the diameter of the said external gear wheel for making the spur gear wheel has 120° difference from the passive cam-disk when they are turned in the same direction.

* * * * *